No. 736,282. Patented August 11, 1903.

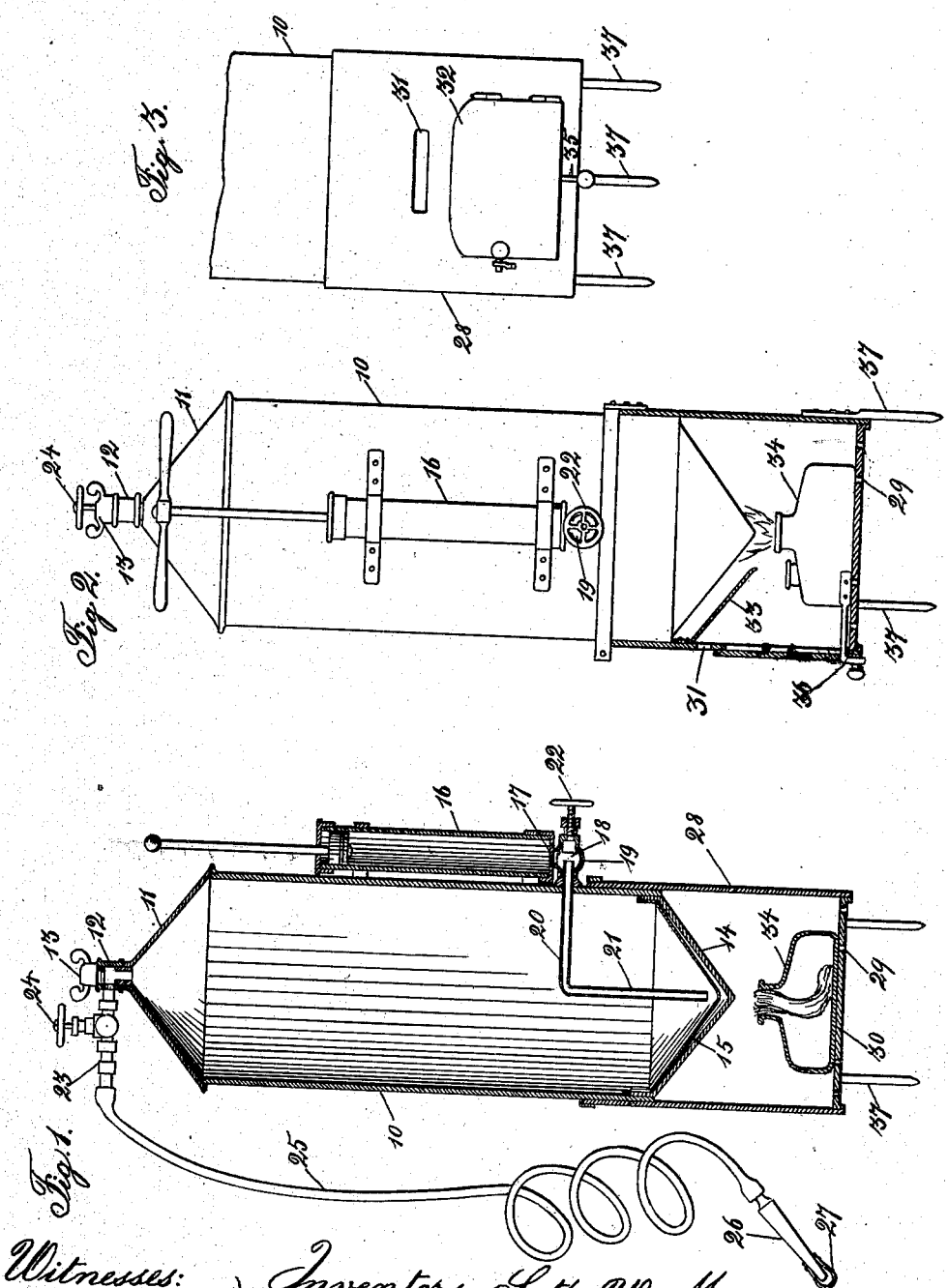

UNITED STATES PATENT OFFICE.

SETH W. MACY, OF COLFAX, AND SHERMAN R. MACY, OF DES MOINES, IOWA.

VERMIN-EXTERMINATOR.

SPECIFICATION forming part of Letters Patent No. 736,282, dated August 11, 1903.

Application filed August 15, 1902. Serial No. 119,819. (No model.)

*To all whom it may concern:*

Be it known that we, SETH W. MACY, residing at Colfax, in the county of Jasper, and SHERMAN R. MACY, residing at Des Moines, in the county of Polk, State of Iowa, citizens of the United States, have invented a certain new and useful Vermin-Exterminator, of which the following is a specification.

The objects of our invention are to provide a vermin-exterminator which is of simple, durable, and inexpensive construction and which can be readily and easily operated.

A further object is to provide an exterminator in which a metal tank is used which is designed to receive the poisonous substance used to exterminate the vermin and which can be readily inflated with air, so that the air and the poisonous substance can be mixed thoroughly.

A further object is to provide a device for heating the substances on the interior of the tank and preventing them from becoming too cold for practical use.

A further object is to provide a tube which can be readily inserted in the hole made by the vermin which it is desired to kill.

A further object is to provide shut-off valves, so that the air and other substances contained in the tank can be retained or let out at the pleasure of the operator.

A further object is to provide an opening at the top of the tank for pouring in the poisonous substance and to provide a double bottom, which will better regulate the applying of the heat to the tank, and, further, to provide a pipe through which the air is forced into the tank which will reach substantially to the bottom of the tank and on account of its peculiar arrangement will cause the air to be thoroughly mixed with the poisonous substances.

A further object is to provide means for adjusting the lamp underneath the tank so that it can either be applied directly to the bottom of the tank or deflected away from it by means of a deflector and an opening in the side of the box containing the lamp, so that this can be done without opening the door to the box containing the lamp.

A further object is to provide means for holding the tank in an upright position when the operator is using the air-pump to fill the tank.

Our invention consists in certain details in the construction, arrangement, and combination of the various parts of the device whereby the objects contemplated are attained, as hereinafter more fully set forth, pointed out in our claims, and illustrated in the accompanying drawings, in which—

Figure 1 is a cross-sectional view of the complete device except the valved pipe out through which the poisonous substance is forced. Fig. 2 is a front elevation of the tank and shows in cross-section the box for containing the lamp beneath the tank. Fig. 3 is a detailed sectional view of the front of the box, showing the door to the box and the opening above the door for allowing the hot air from the lamp to escape when it is drawn outwardly underneath the deflector. It also shows the vertical slot beneath the door for holding the means for moving the lamp into position.

Referring to the accompanying drawings, we have used the reference-numeral 10 to indicate the tank having the conical top portion 11, said conical portion being deflected upwardly from the tank and having an opening 12 extending through its upper portion. Said opening has a screw-threaded interior through part of its length. We have provided a thumb-screw 13, designed to fit in the opening 12 in such a way that the substances on the interior of the tank will be retained therein when the thumb-screw is in the opening 12. This thumb-screw can be removed at the pleasure of the operator, so that he can pour the foreign substance into the tank. At the bottom of the tank, which is hollow and has thin metal sides, we have provided a conical bottom 14, and on the interior of said bottom 14 we have provided an inner bottom 15, this bottom 15 being designed to receive on its upper surface the poisonous substance which is poured into the tank and to prevent the adhering of the poisonous substance to the main bottom of the tank, and thus prevent any corroding of the main bottom when the heat is applied.

To the side of the tank we have fixed the air-pump 16, having the one-way valve 17 at its lower portion, so that when the air is forced downwardly by the piston of the pump the one-way valve 17 will be forced downwardly. Attached to the bottom of this air-pump 16 and outside of the one-way valve 17 is the valve-chamber 18, said chamber having the metal sides 19, said sides being attached to the sides of the tank 10 and to the bottom of the air-pump. Extending into the valve-chamber 18 and through the side of the tank 10 is the metal tube 20, said tube extending to the central portion of the tank and at right angles to the sides of the tank. On the inner end of this tube 20 and extending at right angles to it is an extension of the tube 21, the lower end of said extension being a slight distance above the inner bottom of the tank. Between the outer portion of the sides 19, which are around the air-chamber 18, we have mounted the stop 22, the interior end of said stop being designed to engage the end of the tube 20 which is in the valve-chamber 18, and when the interior end of this stop 22 is in engagement with the said end of the tube 20 the air will be prevented from escaping out of the tank. This stop has a screw-thread on it and a wheel at its outer end, so that it can be readily screwed into engagement with the tube 20 or drawn out of engagement with said tube by unscrewing it. This stop 22 is designed to be used only when the one-way valve 17 does not retain all of the air which has been forced into the interior of the tank. By having this stop 22 an absolutely air-tight covering is added, preventing any air from escaping from the opening in the tube.

To the upper portion of the tank and opening into the opening 12 through the sides which form said opening we have provided a metal pipe 23, having the stop-cock 24 therein, said stop-cock being designed to control the flow of the air from the tank. To the outer end of the metal pipe 23 we have attached a hose-pipe 25, said hose-pipe being considerably longer than the height of the tank and the box beneath the tank, so that the operator can have plenty of hose to reach any reasonable distance from the top of the tank. To the end of the hose-pipe 25 which is away from the metal pipe 23, we have provided a nozzle 26, which is hollow on its interior and substantially circular in shape. Said nozzle has a metal protector 27 at its outer end, said protector being designed to prevent the dirt from entering the hole in the end of the nozzle, and thus allow the air and poisonous substances to be forced readily through the opening into the hole in which the nozzle has been placed.

Attached to the bottom of the tank and extending some distance below it we have provided a box 28, having the circular openings 29 through its bottom portion 30. At one side of the box we have provided the opening 31 and the door 32. The slot 31 is immediately above it. Extending substantially parallel with one side of the conical bottom is the heat-deflector 33, which is so arranged that when the lamp 34 is pulled outwardly from beneath the bottom of the tank 10 the flame coming from the lamp will come against this deflector and the heat will be drawn outwardly through the opening 31 on account of the drafts created by the openings in the bottom of the box and the opening 31. Beneath the door and through the front portion of the box we have cut a slot 35, said slot being designed to receive the wire handle 36, said handle being attached to the lamp 34 and extending through the slot 36, so that by pulling the handle outwardly when the lamp is beneath the bottom of the tank the lamp will be drawn beneath the deflector 33, so that the flame will be beneath said deflector and the heat will be drawn outwardly by it, or by pushing the rod 36 inwardly when the lamp is beneath the deflector the flame coming from said lamp will be directly beneath the bottom of the tank and a direct heat will be applied to the bottom of the tank. The deflector 33 in this instance causes the entire flame to be thrown against the bottom of the tank owing to the distance between said deflector and the bottom of the tank. To the outside of the box 28 we have firmly attached the prongs 37, said prongs extending downwardly from the lower edge of the box and being designed to enter the ground and hold the mechanism firmly in position when the operator is forcing air into the tank with the air-pump.

In practical use and assuming that the operator is desirous of using the exterminator for killing gophers, rats, or other vermin he takes out the thumb-screw 13 from the top of the tank and pours carbon disulfid or other poisonous substance into the tank through the opening 12. When he has put in a sufficient amount of the poisonous substance, he replaces the thumb-screw 13 in position at the top of the tank and adjusts the stop-cock 24, so that no air can escape through the opening in the pipe 23. He then lights the lamp 34 and places it beneath the bottom of the tank, as shown in Fig. 2. He turns the stop-cock 22 away from engagement with the metal tube 20, as shown in Fig. 1, and by using the air-pump 16 forces the air in the tank 10 through the valve-chamber 18 and the tubes 20 and 21. The one-way valve 17 will be forced downwardly when the piston of the pump is forced downwardly and the air will enter the chamber 18. The one-way valve 17 will then be drawn upwardly by the suction which is created by drawing the piston upwardly and will be forced against the bottom of the pump 16 by the pressure of the air which is in the tank 10. When the tank 10 has been filled with sufficient air to create the air-pressure desired, the stop-cock 22 is screwed into engagement with the tube 20, thus preventing any escape of the air from the tank through the opening in that tube. The operator then locates the burrow of the gopher by means of a prodding-iron, which he also uses for providing an opening for the nozzle 26. After this opening has been provided the nozzle 26, which is on the end of the hose 25, is inserted into the said opening, and the dirt is prevented from getting into the opening in the nozzle 26 by means of the protector 27. He then allows the air to escape from the tank through the hose 25 and the nozzle 26 by unscrewing the stop-cock 24. It will be seen that on account of the way the stop-cock 24 is arranged the flow of the air through the hose can be easily controlled. If the supply of air is not sufficient to exterminate the vermin into whose burrow the nozzle has been thrust, more gas can be generated by pumping more air into the tank and allowing the lighted lamp to remain beneath the generator. If at any time the heat becomes too intense and the operator does not desire to put out the lamp, he can draw this lamp outwardly by means of the handle 36, which is attached to it, until it is beneath the deflector 33, which causes the heat to be diverted from the bottom of the tank through the opening 31 in the side of the box 28.

Having thus described our invention, what we claim as new, and desire to secure by Letters Patent of the United States therefor, is—

1. In a device of the class described, the combination of a tank, an inner and outer bottom in said tank having a small air-space between them, a metal tube extending into said tank substantially at right angles to the bottom at its lower portion and substantially parallel with the bottom at its upper portion, an air-pump attached outside of said tube for forcing the air into the tank immediately above the bottom to thoroughly mix the substances in the tank, a lamp mounted beneath said bottoms, a deflector for turning the flame of the lamp from the lamp outwardly when said lamp is beneath the deflector, for the purposes stated.

2. In a device of the class described, the combination of a tank having a valve-controlled opening at its upper portion, a tube attached to said valve-controlled opening, an air-pump attached to the side of the tank for forcing air into it, a box having a door in one side thereof and an opening above the door, a deflector on the interior of said box and extending inwardly and rearwardly from said opening for diverting the heat outwardly when the lamp is placed beneath the deflector, a lamp adjustable in said box, a handle attached to said lamp and extending through the side of the box for removing the lamp from the interior of the box and for adjusting it in said box, substantially as and for the purposes stated.

3. In a device of the class described, the combination of an air-tank having a screw-threaded opening in its top, a thumb-screw to fit in said opening, a valved pipe extending through the top of the tank into said opening, a metal tube extending into the side of said tank, an air-pump attached to the side of said tank having a valve-controlled outlet in its bottom, a valve-chamber for connecting the bottom of said air-pump and the tube extending through the side of the tank, and a lamp adjustably mounted beneath said tank, substantially as and for the purposes stated.

4. In a device of the class described the combination of a tank having a valve-controlled opening in its upper portion, means attached to the side of the tank for forcing the air into it, a box having a door in one side thereof and an opening above the door, a deflector on the interior of said box and extending inwardly and rearwardly from said opening for diverting the heat outwardly when the lamp is set beneath the deflector, a lamp adjustably mounted in said box, substantially as and for the purposes stated.

5. In a device of the class described the combination of a tank having a valve-controlled opening in its upper portion, means attached to the side of the tank for forcing the air into it, a box having a door in one side thereof and an opening above the door, a lamp in said box, means extending through the sides of the box for adjusting the lamp in the box from the outside of it, substantially as and for the purposes stated.

6. In a device of the class described, the combination of an air-tank, a box beneath said air-tank, a lamp adjustably mounted in said box, a deflector mounted in said box so arranged that when the lamp is placed beneath the deflector the heat will be thrown outwardly from the bottom of the tank.

7. In a device of the class described, the combination of a tank having a conical-shaped bottom, a deflector attached beneath the tank, a lamp adjustably mounted beneath the tank, means for adjusting said lamp beneath the tank, said deflector being so arranged that when the lamp is placed beneath it the heat will be deflected from the bottom of the tank, for the purposes stated.

SETH W. MACY.
SHERMAN R. MACY.

Witnesses:
R. SHEDENHELM,
W. R. LANE.